(12) United States Patent
Hernandez et al.

(10) Patent No.: US 9,202,612 B2
(45) Date of Patent: Dec. 1, 2015

(54) COLD SHRINK ASSEMBLY

(71) Applicant: Thomas & Betts International, Inc., Wilmington, DE (US)

(72) Inventors: Carlos Hernandez, Germantown, TN (US); Stanley S. Szyszko, Wall, TN (US); Roger L. Lucero, Albuquerque, NM (US); Daniel L. Gardner, Stewartsville, NJ (US)

(73) Assignee: Thomas & Betts International, LLC, Wilmington, DE (US)

( * ) Notice: Subject to any disclaimer, the term of this patent is extended or adjusted under 35 U.S.C. 154(b) by 110 days.

(21) Appl. No.: 13/965,477

(22) Filed: Aug. 13, 2013

(65) Prior Publication Data

US 2014/0090875 A1 Apr. 3, 2014

Related U.S. Application Data

(60) Provisional application No. 61/707,298, filed on Sep. 28, 2012.

(51) Int. Cl.
| | |
|---|---|
| *H01B 17/58* | (2006.01) |
| *H01H 19/00* | (2006.01) |
| *H01B 19/00* | (2006.01) |
| *H02G 15/18* | (2006.01) |

(52) U.S. Cl.
CPC ............. *H01B 17/58* (2013.01); *H01B 19/00* (2013.01); *H02G 15/1826* (2013.01); *Y10T 29/49227* (2015.01)

(58) Field of Classification Search
CPC ....... H01R 4/00; H02G 1/14; H02G 15/1826; H02G 15/1813; H02G 15/184; H02G 15/20; Y10T 428/1328; Y10T 29/49071; Y10T 29/53243; Y10T 29/49227; H01B 17/58; H01B 19/00; H01B 17/583
USPC ....... 174/68.1, 91, 72 A, 73.1, 650, 652, 135, 174/137 R, 74 R, 77 R, 84 R, 74 A, 85, 86, 92, 174/93, 167; 428/36.8, 36.9, 34.9, 35.1
See application file for complete search history.

(56) References Cited

U.S. PATENT DOCUMENTS

| | | |
|---|---|---|
| 3,717,717 A | 2/1973 | Cunningham et al. |
| 4,135,587 A | 1/1979 | Diaz |

(Continued)

FOREIGN PATENT DOCUMENTS

| | | |
|---|---|---|
| CA | 2062663 | 9/1993 |
| EP | 1006632 | 6/2000 |
| WO | 2012/083984 | 6/2012 |

*Primary Examiner* — Angel R Estrada
(74) *Attorney, Agent, or Firm* — Snyder, Clark, Lesch & Chung, LLP

(57) ABSTRACT

A cold shrink assembly includes a first member, a second member, a shrink fit joint and a band. The first member has a tapered shape and includes a first opening or first notch. The second member has a tapered shape and includes a second opening or second notch. The shrink fit joint is disposed over a portion of the first and second members. The band is configured to secure the first and second members in a predetermined position. The band extends through the first opening or first notch, along a first portion of an outer surface of the cold shrink assembly, through the second opening or second notch, and loops back to the first opening or first notch along a second portion of the outer surface of the cold shrink assembly.

20 Claims, 8 Drawing Sheets

(56) References Cited

U.S. PATENT DOCUMENTS

| | | |
|---|---|---|
| 4,304,616 A | 12/1981 | Richardson |
| 4,421,945 A | 12/1983 | Moisson |
| 4,455,041 A | 6/1984 | Martin |
| 4,487,994 A | 12/1984 | Bahder |
| 4,506,430 A | 3/1985 | Guzay, Jr. |
| 4,639,546 A | 1/1987 | Meltsch |
| 4,736,072 A | 4/1988 | Hvidsten |
| 4,874,193 A | 10/1989 | Martin |
| 4,951,978 A | 8/1990 | Martin |
| 5,087,492 A | 2/1992 | Vallauri et al. |
| 5,098,752 A | 3/1992 | Chang et al. |
| 5,215,607 A | 6/1993 | Read et al. |
| 5,248,169 A | 9/1993 | Barbe et al. |
| 5,313,019 A | 5/1994 | Brusselmans et al. |
| 5,406,871 A | 4/1995 | Lambert, Jr. |
| 5,446,241 A | 8/1995 | Mackaness et al. |
| 5,467,515 A | 11/1995 | Luzzi |
| 5,492,740 A | 2/1996 | Vallauri et al. |
| 5,560,969 A | 10/1996 | Portas |
| 5,570,497 A | 11/1996 | Luzzi |
| 5,577,310 A | 11/1996 | Cheenne-Astorino et al. |
| 5,683,273 A | 11/1997 | Garver et al. |
| 5,753,861 A | 5/1998 | Hansen et al. |
| 5,801,332 A | 9/1998 | Berger et al. |
| 5,844,170 A | 12/1998 | Chor et al. |
| 5,922,423 A | 7/1999 | Jeremko |
| 6,103,975 A | 8/2000 | Krabs et al. |
| 6,472,600 B1 | 10/2002 | Osmani et al. |
| 6,796,820 B2 | 9/2004 | Jazowski et al. |
| 6,948,976 B2 | 9/2005 | Goodwin et al. |
| 6,991,484 B2 | 1/2006 | Luzzi |
| 7,431,599 B2 | 10/2008 | Luzzi |
| 7,511,222 B2 | 3/2009 | Taylor et al. |
| 7,767,909 B2 | 8/2010 | Krabs et al. |
| 7,838,770 B2 | 11/2010 | Portas et al. |
| 8,119,193 B2 | 2/2012 | Vallauri et al. |
| 8,273,200 B2 | 9/2012 | Portas et al. |
| 8,445,783 B2 * | 5/2013 | Taylor et al. ............ 174/84 R |
| 8,853,563 B2 * | 10/2014 | Verner et al. ............ 174/84 R |
| 2003/0124285 A1 | 7/2003 | Hopcus et al. |
| 2004/0262025 A1 | 12/2004 | Brandt et al. |
| 2005/0269124 A1 | 12/2005 | Suzuki et al. |
| 2007/0275194 A1 | 11/2007 | Suzuki et al. |
| 2011/0254197 A1 | 10/2011 | Verner et al. |

\* cited by examiner

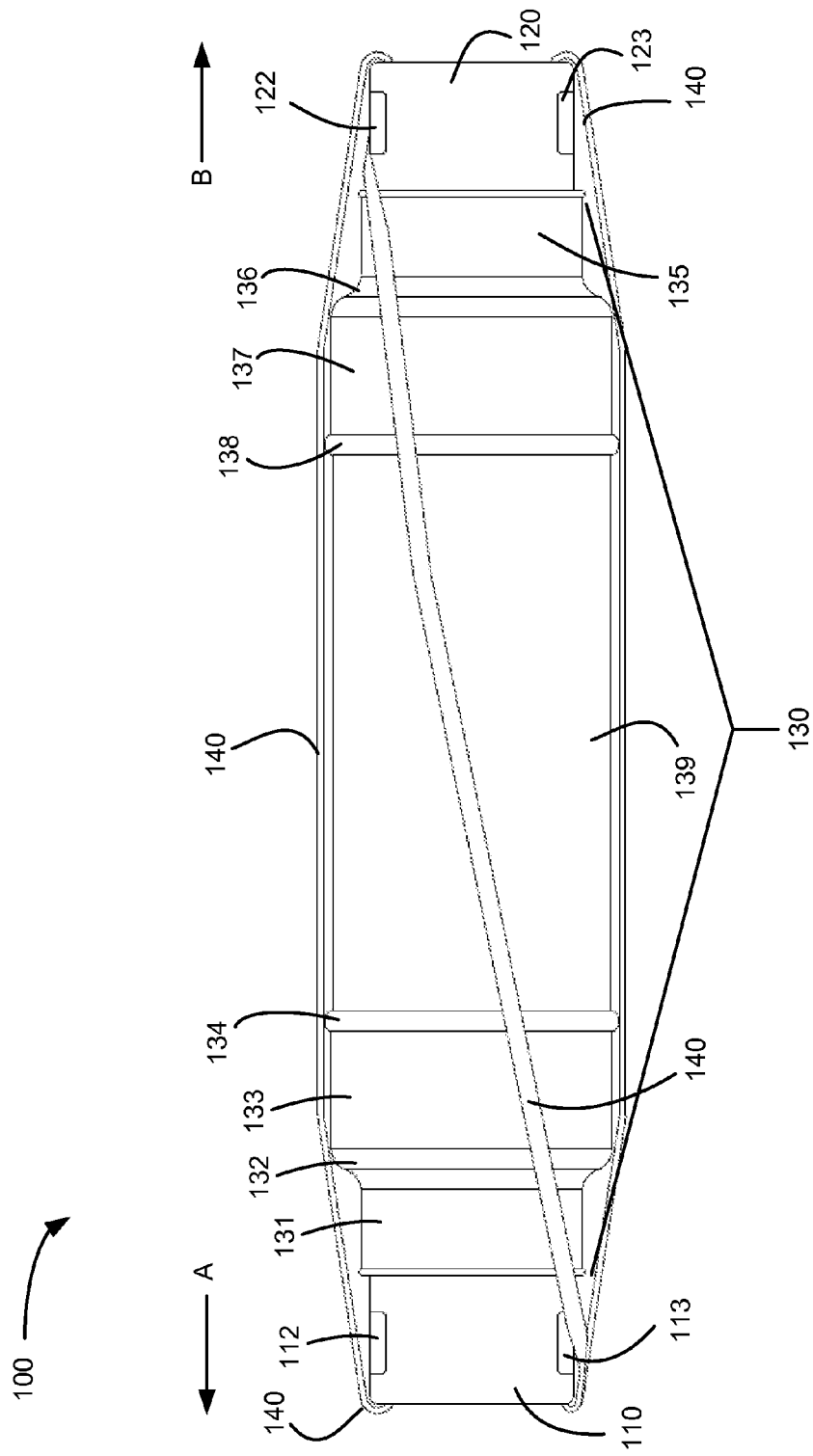

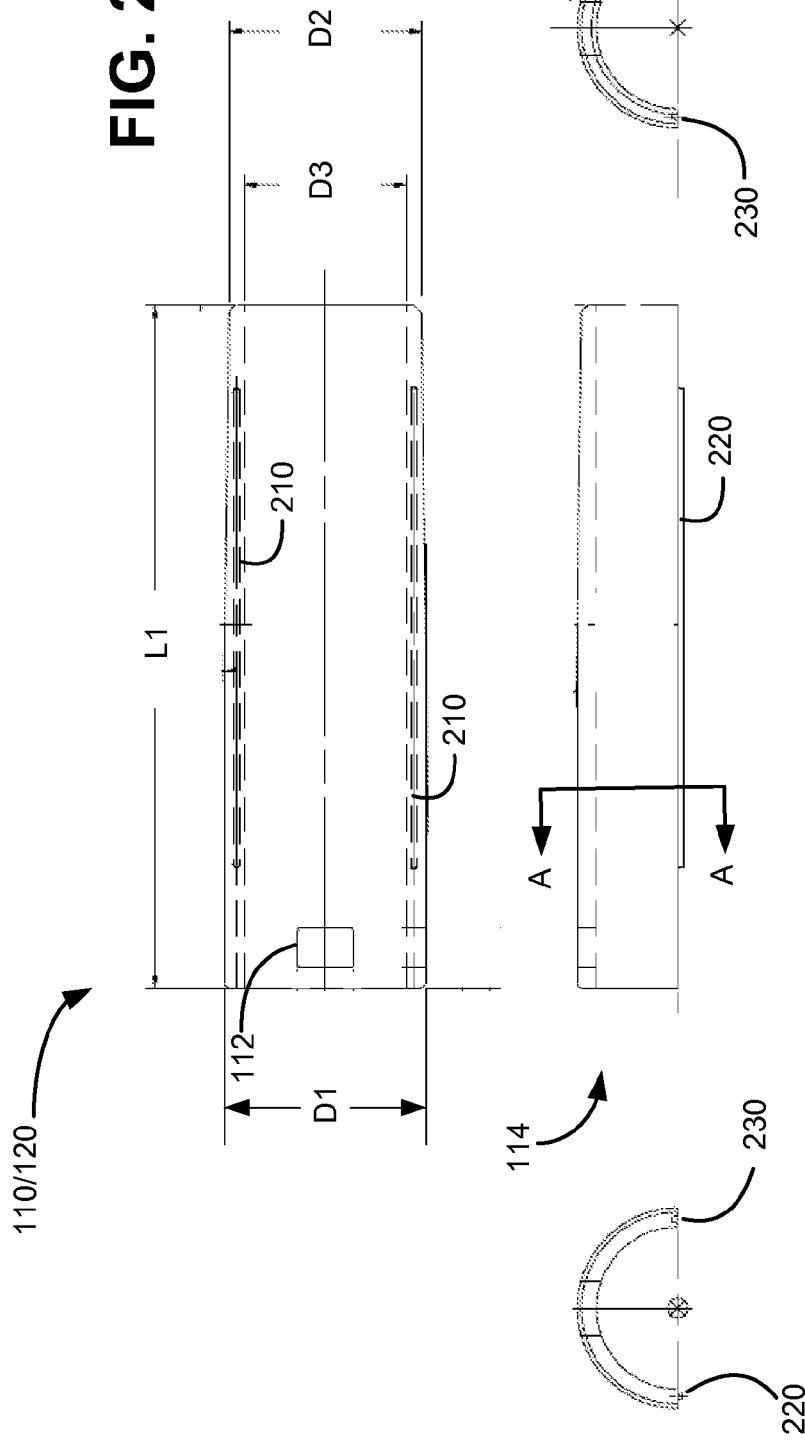

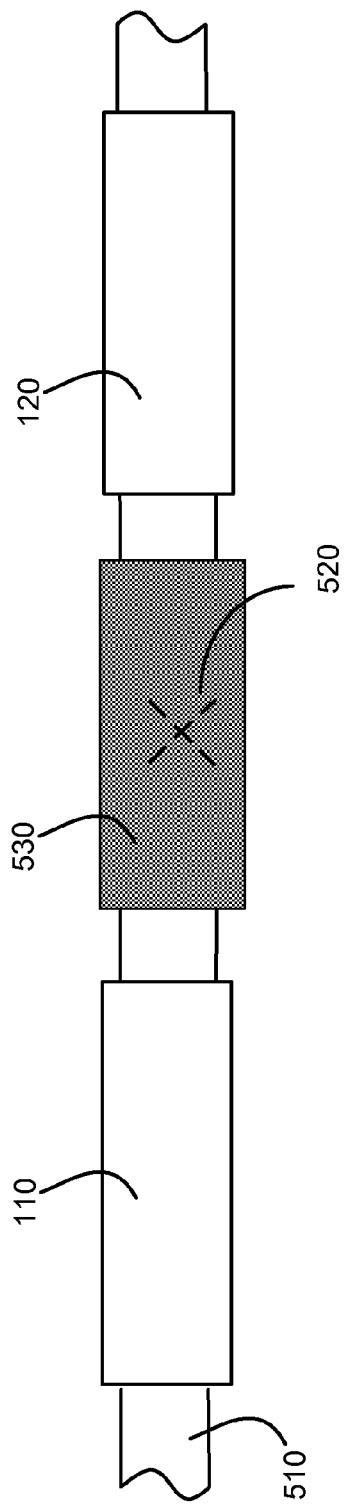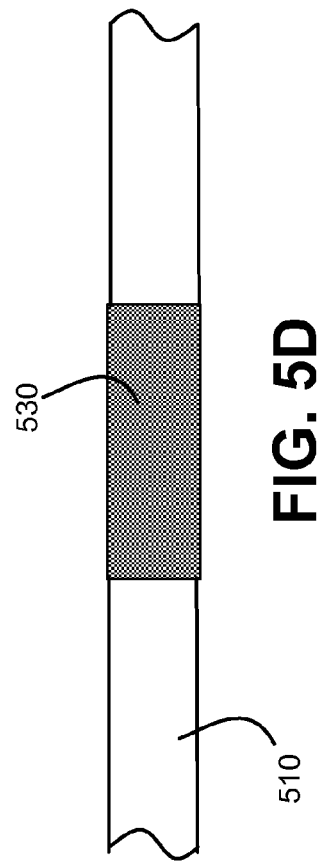

COLD SHRINK ASSEMBLY

RELATED APPLCATION

This application claims priority under 35 U.S.C. §119 based on U.S. Provisional Patent Application No. 61/707,298, filed Sep. 28, 2012, the disclosure of which is hereby incorporated herein by reference.

BACKGROUND INFORMATION

Cold shrink products are typically used to insulate electrical wires and/or electrical splices. For example, one conventional cold shrink product includes a plastic core, a pull tab and insulating material formed over the plastic core. An installer may slide the plastic core over an electrical cable to the location of the splice and pull the pull tab to unwind the plastic core. The insulating material then contracts over the electrical wires/splice. One drawback with such cold shrink products is that the pull cord often gets stuck inside the splice. As a result, it is often difficult to unwind and remove the plastic core to properly insulate the wires/splice.

Another conventional cold shrink product includes a plastic tube that must be cracked to get it apart and removed from the electrical cable after the insulating material is disposed over the splice. Taking apart such a device may be time consuming and difficult in certain circumstances.

BRIEF DESCRIPTION OF THE DRAWINGS

FIG. 1A is a side view of exemplary cold shrink assembly in a connected configuration;

FIG. 2A is a side view of one of the cold shrink cores of FIG. 1A;

FIG. 2B is a side view of a portion of one of the cores illustrated in FIG. 2A;

FIGS. 2C and 2D are sectional views of the portion of the core illustrated in FIG. 2B;

FIGS. 5A-5D schematically illustrate an exemplary use of the cold shrink assembly of FIG. 1A or 1B.

DETAILED DESCRIPTION OF PREFERRED EMBODIMENTS

Figure 1B:
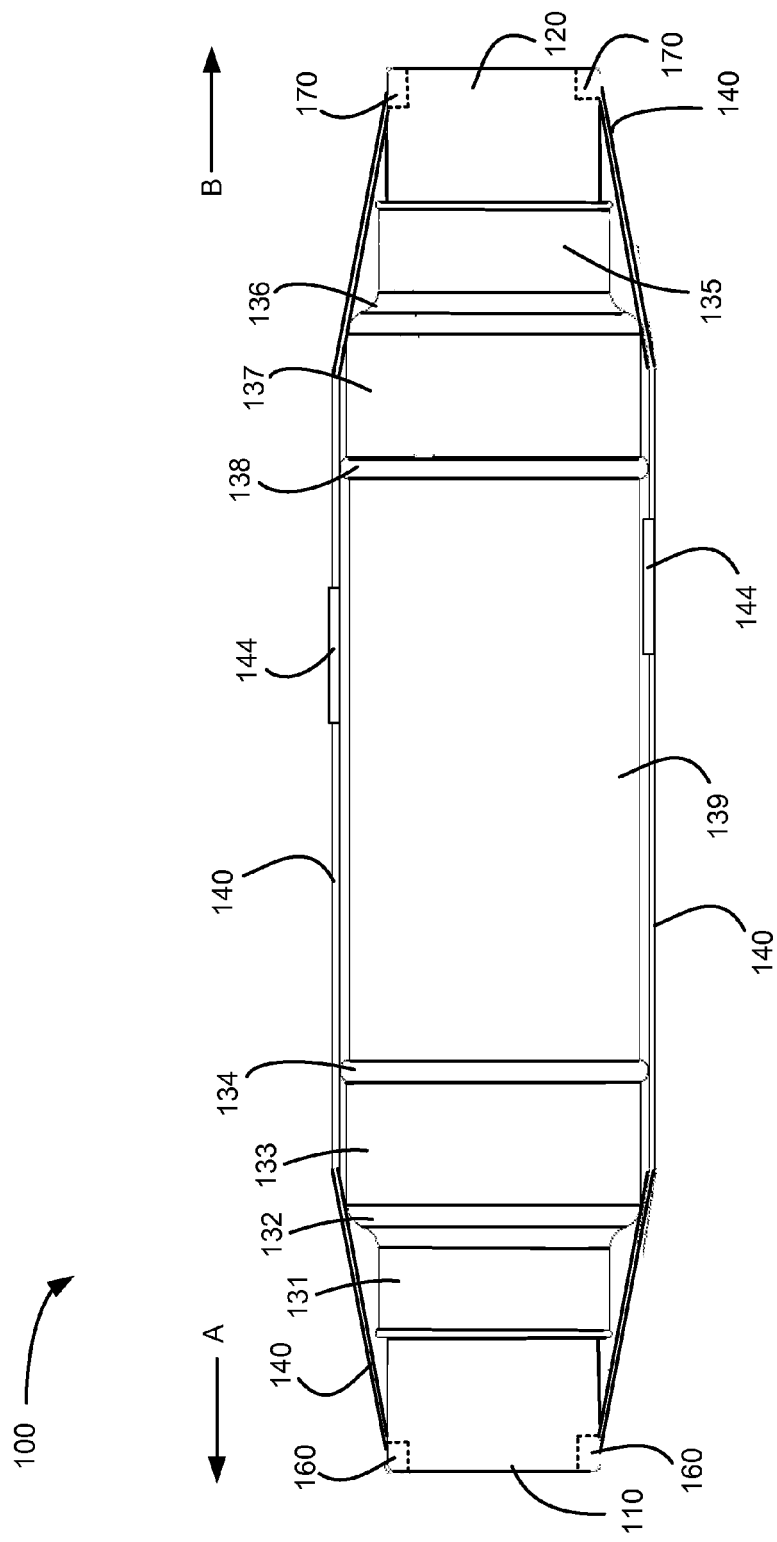
FIG. 1B is a side view of another exemplary cold shrink assembly in a connected configuration.

The following detailed description refers to the accompanying drawings. The same reference numbers in different drawings may identify the same or similar elements. Also, the following detailed description does not limit the invention.

Embodiments described herein provide a cold shrink assembly that may be used to install electrical insulation over electrical wires or a splice. In an exemplary implementation, the cold shrink assembly may include two cores upon which a cold shrink material is placed. The two cores may be made of multiple portions that make up each of the two cores. When the cold shrink material is placed over the cores, the pressure exerted by the cold shrink material on the cores causes the cores to begin to push out from each other. A band or strap is then placed over the cores to hold them in the desired position. When the cold shrink material is ready to be installed, the cores are placed (e.g., slid) onto an electrical cable and moved to a location at which the cold shrink material will be deposited. The band or a strap holding the two cores together is then cut. The cores will then push out for easy removal and the cold shrink material will be deposited at the desired location (e.g., the splice). The insulating material then contracts over the splice/wires. In one implementation, each of the two cores is tapered and includes two halves that are interconnected to form the core. The two halves may separate or be easily separated after the band is cut for easy removal from the cable/splice area after the cold shrink material is deposited.

FIG. 1A is a side view of cold shrink assembly 100 in an assembled configuration consistent with an exemplary implementation. Referring to FIG. 1A, cold shrink assembly 100 includes a first core 110, a second core 120 and a shrink fit joint 130 (also referred to herein as cold shrink joint 130) stretched over cores 110 and 120. In an exemplary implementation, each of cores 110 and 120 are substantially cylindrical in shape and made of plastic. Cores 110 and 120 may also be hollow cores that are formed of two separate parts or halves that interlock. In other implementations, core 110 and/or 120 may each be made of multiple portions that each include two separate halves that interlock to form one of cores 110 and/or 120. In still other implementations, cores 110 and 120 may have other shapes (e.g., have hexagonal, octagonal, or other cross-sectional shapes) and may be made of other materials, such as metal (e.g., aluminum), polymers, composite materials, etc. The cylindrical cores 110 and 120 may also be tapered such that the portions of cores 110 and 120 covered by shrink fit joint 130 have a smaller diameter than the end portions illustrated in FIG. 1A. Core 110 may also include two openings or apertures 112 and 113 located on one end of core and core 120 may include two openings or apertures 122 and 123 located on one end of core 120. Openings or notches 112, 113, 122 and 123 may act as loops through which a band or strap is inserted and looped to hold cores 110 and 120 in the desired position.

Band 140 holds cores 110 and 120 in the assembled configuration illustrated in FIG. 1A until the time that an installer wishes to install shrink fit joint 130 over an electrical splice (not shown). At that time, the installer may cut band 140. Band 140 may be made from plastic, nylon, a fabric material or some other material that is used to provide tension to hold cores 110 and 120 in place until the shrink fit joint 130 is to be installed. Band 140 may be installed around the end portions of cores 110 and 120, as shown in FIG. 1A (not shown in FIG. 1A) such that band 140 provides tension to hold cores 110 and 120 in place and to keep them from separating. Band 140 may also include a buckle or other mechanism (not shown in FIG. 1A) to allow a party to tighten band 140 to the desired tension and to ensure that cores 110 and 120 are maintained in the desired position.

Referring to FIG. 1A, band 140 may be inserted through one side of opening 112 looped back through the other side of opening 112, and run the length of the outer surface of cold shrink assembly 110 to opening 122. At opening 122, band 140 may be inserted through one side of opening 122, run diagonally the length of the outer surface of cold shrink assembly 100 to opening 113, as illustrated in FIG. 1A. At opening 113, band 140 may be inserted through one side of opening 113, looped back through the other side of opening 113 and run the length of the outer surface of cold shrink assembly 100 to opening 123. At opening 123, band 140 may be inserted in one side of opening 123, looped back through the other side of opening 123 and run diagonally on the opposite side of the outer surface of cold shrink assembly 100 back to opening 112. In this manner, band 140 may form a continuous loop through openings 112, 113, 122 and 123 to hold cores 110 and 120 in the desired position, without band 140 being run along the interior of cores 110 and 120. Connecting band 140 in this manner holds cores 110 and 120 in the desired position, while also ensuring that cores 110 and 120 do not bend or buckle. In addition, running band 140 on the exterior surfaces of cold shrink assembly 100 (e.g., outside cores 110 and 120) helps ensure that band 140 does not get stuck in a splice when cold shrink joint 130 is installed.

Band 140 may also include a buckle or other mechanism (not shown in FIG. 1A) used to tighten band 140 to the desired tension. In some implementations, multiple bands similar to band 140 may be used to hold cores 110 and 120 in the desired position. In such implementations, the bands are run on the exterior surfaces of cold shrink assembly 100 in a similar manner to band 140.

In each case, when band 140 (or the multiple bands) is cut, cores 110 and 120 push out and the two halves of each of cores 110 and 120 will split apart and/or pull away from the center of cold shrink assembly 100. The insulating material and/or semiconductive material of shrink fit joint 130 may be elastic such that when band 140 is cut and cores 110 and 120 pull away and are removed, the insulating material contracts over, for example, an electrical splice to insulate the splice.

Referring back to FIG. 1A, shrink fit joint 130 includes an assembly designed to insulate an electrical connection or splice. Shrink fit joint 130 includes end portion 131, transition shoulder 132, portion 133 and portion 134 located on one side of shrink fit joint 130 (i.e., over core 110). Shrink fit joint 130 also includes end portion 135, transition shoulder 136, portion 137 and portion 138 located on the other side of shrink fit joint 130 (i.e., over core 120). Shrink fit joint 130 also includes center portion 139 located over portions of both of cores 110 and 120. Portion 139 includes insulation material and/or semiconductive material that contracts when cores 110 and 120 are removed to insulate an electrical connection/joint and continues to provide shielding of the cable.

Shrink fit joint 130 may be assembled and placed over cores 110 and 120. For example, cores 110 and 120 may be placed into a fixture that squeezes them together and holds the two sides of each of cores 110 and 120 such that cores 110 and 120 abut each other, or nearly abut each other, while shrink fit joint 130 is assembled onto cores 110 and 120. The shrink fit insulation and/or semiconductive material at portion 139 of shrink fit joint 130 may then begin to shrink slightly and exert a downward pressure on the ends of cores 110 and 120 that abut or nearly abut each other. The downward force on cores 110 and 120 may cause cores 110 and 120 to exert a force along the length of cores 110 and 120 in the direction of arrows A and B (shown in FIG. 1A), respectively. That is, core 110 begins to push away from shrink fit join 130 in the direction of arrow A and core 120 begins to push away from shrink fit join 130 in the direction of arrow B.

In accordance with one implementation, when cores 110 and 120 have moved in the direction of arrows A and B by a predetermined amount (e.g., approximately one half of one inch to one inch in the direction of arrows A and B), band 140 is installed and tightened to hold cores 110 and 120 in place until field installation. In other implementations, band 140 may be installed when cores 110 and 120 are still abutting each other, or are just separated from each other, such as by a distance of one tenth of one inch or less. In each case, cores 110 and 120 are located close to each other, or touching each other, but are not locked together. At the time of installation, an installer may cut band 140 to install shrink fit joint 130, as described in more detail below.

Referring back to FIG. 1A, shrink fit joint 130 is made of an insulating material. End portions 131 and 135 are disposed over the ends of cores 110 and 120, respectively. Shoulder portion 132 couples end portion 131 to portion 133. Similarly, shoulder portion 136 couples end portion 135 to portion 137. Portions 134 and 138 act as end portions or outside portions of portions 133 and 137, respectively. Portions 134 and 134 may also extend outwardly with respect to portions 133 and 137, respectively, as illustrated in FIG. 1A. Portions 134 and 138 are also located adjacent to center portion 139 of shrink fit joint 130, which includes the insulating material that contracts over a splice, as described in more detail below.

FIG. 1B illustrates a side view of cold shrink assembly 100 in accordance with another exemplary implementation. Referring to FIG. 1B, cold shrink assembly includes cores 110, 120 and shrink fit joint 130 similar to that described above with respect to FIG. 1A. In this implementation, the end portion of each of cores 110 and 120 includes a notch that receives a band or strap to hold cores 110 and 120 in the desired position. For example, core 110 includes notch 160 formed on the outer circumference of a portion of core 110. Core 120 includes a similar notch 170 formed on the outer circumference of a portion of core 120. Notches 160 and 170 may be sized to generally correspond to the width of band 140 to ensure that band 140 does not slip when band is holding cores 110 and 120. For example, notches 160 and 170 may range from approximately 0.25 to 1.0 inches in width.

In this implementation, band 140 may be inserted through notch 160 of core 110, run the length of cold shrink assembly 100, be inserted through notch 170 of core 120 and loop back on the opposite side of cold shrink assembly 100 to notch 160, as illustrated in FIG. 1B, and tightened to the appropriate tension to keep cores 110 and 120 in the desired location. In addition, band 140 may include buckles 144, as illustrated in FIG. 1B. Buckles 144 or other tightening mechanisms may enable band 140 to be tightened to the appropriate tension.

As described above, cores 110 and 120 may include two halves that interlock to form a tapered cylindrical member. FIG. 2A is a side view of core 110 consistent with an exemplary implementation. Core 120 may be configured in a similar manner. Referring to FIG. 2A, L1 may represent the length of core 110. In an exemplary implementation, L1 may range from approximately 5.0 inches to approximately 9.0 inches. In other implementations, L1 may have other lengths. As described above, cores 110 and 120 may be tapered to facilitate removal of core 110 upon installation of shrink fit joint 130. D1 may represent the diameter of one end of core 110 and D2 may represent the diameter of core 110 at its tapered or narrower end. In an exemplary implementation, D1 may range from approximately 1.7 inches to approximately 3.1 inches and D2 may range from approximately 1.4 inches to 3.0 inches. In one implementation, D1 is 2.2 inches and D1 is 2.095 inches. In this case, the degree of tapering with respect to cores 110 and 120 is relatively small. However, providing this small amount of tapering allows cores 110 and 120 to be easily removed from a splice. Similar to the discussion above with respect to L1, the dimensions described above with respect to D1 and D2 are exemplary only. It should be understood that other dimensions may be used for D1 and D2 based on the particular implementation.

As described above, in an exemplary implementation, cores 110 and 120 may include two separable portions or halves that fit together. The dashed lines in FIG. 2A represent the inner surfaces of hollow core 110. Connection areas 210 represent the areas at which the two halves of core 110 are attached to each other. D3 represents the distance between connection areas 210. In an exemplary implementation, D3 may range from about 1.4 inches to about 2.7 inches.

In an exemplary implementation, a first one of the two halves of core 110 includes extensions or tabs located on one side and a groove on the opposite side. The other of the two halves includes a mating groove and extensions/tabs that allow the two halves to interlock to secure the two halves together.

FIG. 2B illustrates one of the halves or core 110, labeled 114, which is rotated 90 degrees with respect to the center line shown in FIG. 2A. Referring to FIG. 2B, half 114 includes extension 220 (also referred to as tabs 220), located at connection area 210, that extends from one side of half 114 along the majority of the length of half 114. The opposite side of half 114 may include a groove that runs the majority of the length of half 114, as illustrated by the second connection area 210 in FIG. 2A. FIG. 2C illustrates a cross-section of half 114 taken along line AA in FIG. 2B. As illustrated, one side of half 114 includes extension 220 and the opposite side of half 114 includes groove 230. Extension 220 will mate with a corresponding groove (similar to groove 230) located on the opposite half of core 110 and groove 230 will mate with a corresponding extension (similar to extension 220) located on the other half of core 110. In accordance with one implementation, extensions 220 and groove 230 may also include angled sides that correspond to angled sides in the mating groove and extension, as described in more detail below.

FIG. 2D illustrates a cross-sectional view of half 114 of FIG. 2B looking in the opposite direction as the cross-section illustrated in FIG. 2C. As illustrated, half 114 includes groove 230 and extension 220 that will mate with a corresponding extension and groove on the opposite half of core 110.

Figure 3A:
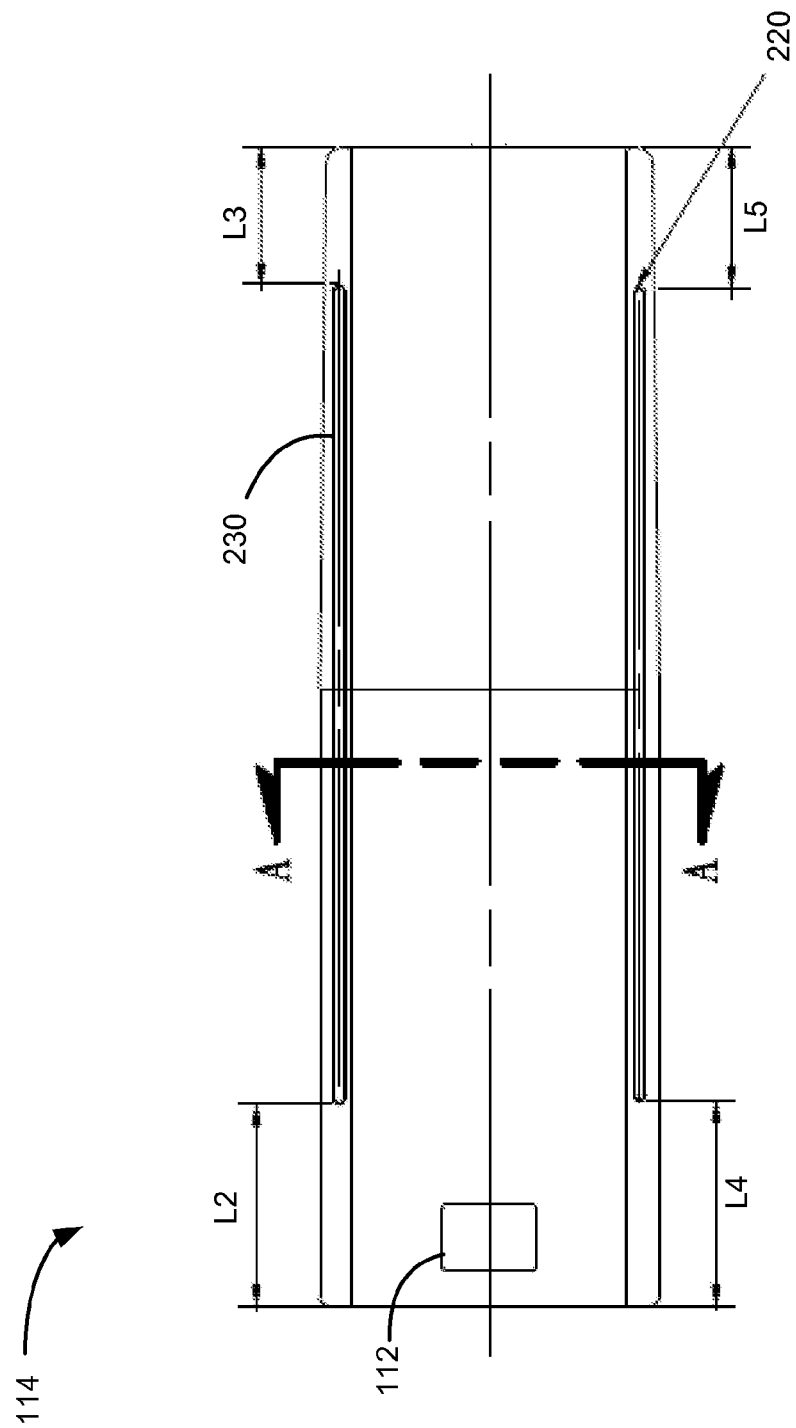
FIGS. 3A and 3B are a side view and a partial sectional view, respectively, of a portion of the cores illustrated in FIG. 1A.

FIG. 3A is a side view of half 114 of core 110 with the hollow inside of half 114 exposed. Referring to FIG. 3A, L2 represents the distance from the end of core 110 to groove 230 and L3 represents the distance from the other end of core 110 to the beginning of groove 230. In an exemplary implementation, L2 may range from approximately 1.4 inches to 1.6 inches and L3 may range from approximately 1.0 inches to 1.2 inches. L4 represents the distance from the end of core 110 to the beginning of extension 220 and L5 represents the distance from the other end of core 110 to the other side of extension 220. In an exemplary implementation, L4 may range from approximately 1.5 inches to 1.7 inches and L5 may range from approximately 1.0 inches to 1.2 inches. Similar to the discussion above with respect to FIGS. 2A-2D, the dimensions described above with respect to L2-L5 are exemplary only. It should be understood that other dimensions may be used for L2-L5 based on the particular implementation.

Figure 3B:
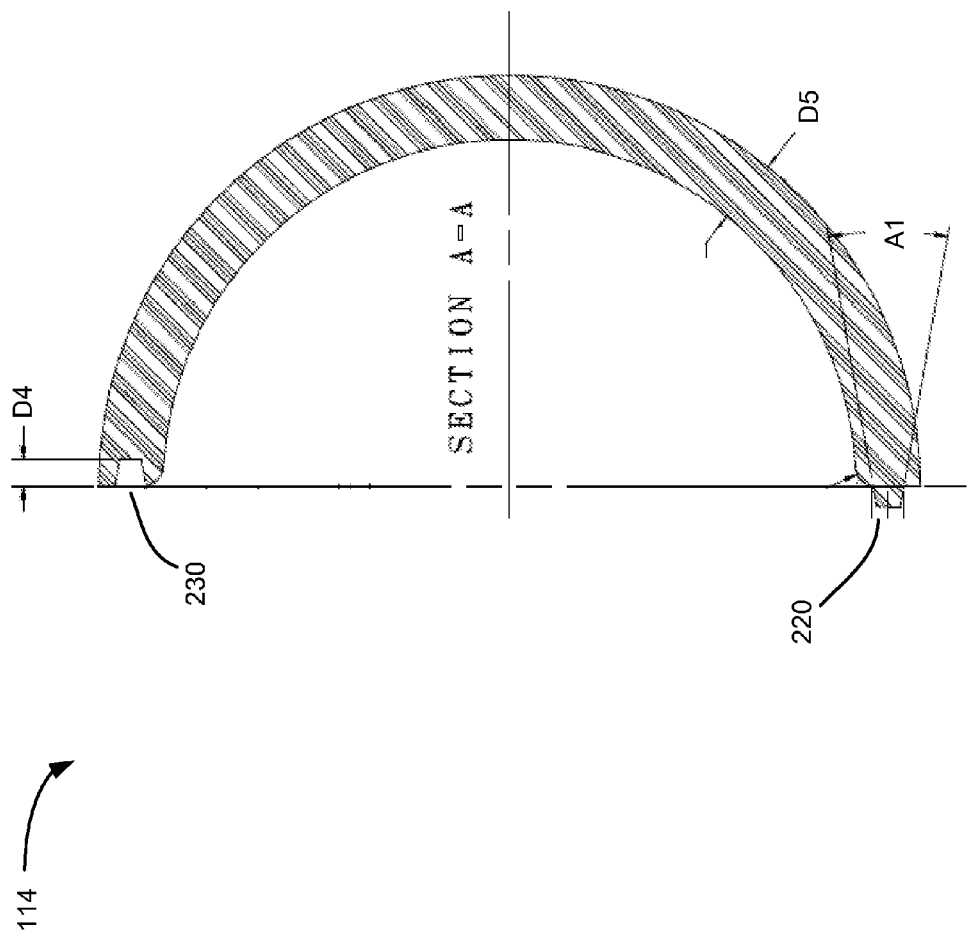

As discussed previously with respect to FIGS. 2C and 2D, half 114 may be connected at connections areas 210 to an opposite half via extensions 220 and grooves 230. FIG. 3B illustrates a partial cross-section of half 114 of FIG. 3A taken along AA in FIG. 3A. Referring to FIG. 3B, groove 230 has a tapered or trapezoidal shape, with D4 representing the depth of groove 230. In an exemplary implementation, D4 may range from approximately 0.06 inches to 0.10 inches. Correspondingly, extension 220 has a similar trapezoidal shape, as illustrated in FIG. 3B, such that it can be received in groove 230 in the opposing half of core 110. Angle A1, which represents the angle of the side walls of extension 220 with respect to the vertical line illustrated in FIG. 4B, may range from approximately 15 degrees to about 25 degrees. In one implementation, A1 may be 20 degrees.

Referring to FIG. 3B, D5 represents the thickness of the walls of half 114. In an exemplary implementation, D5 may range from approximately 0.15 inches to 0.30 inches in thickness. Similar to the discussion above with respect to FIGS. 2A-2D, the dimensions described above with respect to D4, D5 and A1 are exemplary only. It should be understood that other dimensions may be used for D4, D5 and A1 based on the particular implementation. In addition, the opposite half of core 110 may be configured in a manner similar to half 114. That is, the opposite half of core 110 includes an extension and groove similar to extension 220 and groove 230 that mate with the corresponding groove 230 and extension 220 of half 114.

Figure 4:
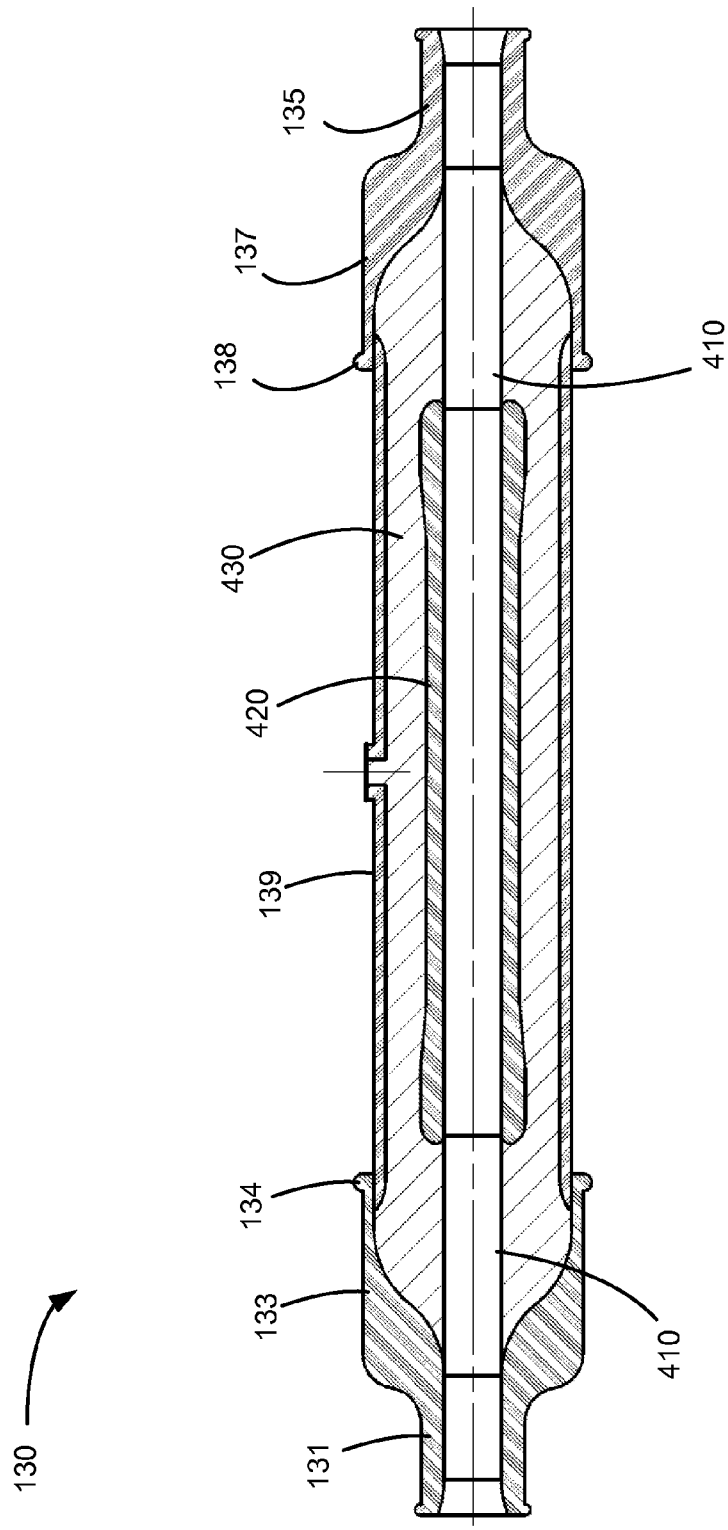
FIG. 4 is a sectional view of the cold shrink joint of FIGS. 1A and 1B in accordance with an exemplary implementation.

As described above, shrink fit joint 130 may be fabricated and installed over cores 110 and 120. FIG. 4 illustrates a cross-section of cold shrink joint 130 prior to shrink fit joint 130 being installed over cores 110 and 120. Referring to FIG. 4, shrink fit joint 130 includes portions 131-139 as described above with respect to FIGS. 1A and 1B. Shrink fit joint 130 also includes a frame member 410 on which cold shrink joint 130 is formed. Frame member 410 may be removed when shrink fit joint 130 is stretched onto cores 110 and 120.

Shrink fit joint 130 includes a first dielectric material 420, a second dielectric material 430 and an outer shell. The other shell of shrink fit joint 130 may be formed of an elastomer, such as ethylene propylene diene monomer (EPDM). Dielectric materials 420 and 430 may be formed of a shrink fit material that contracts to surround electrical wires, such as a splice, to insulate the wires/splice. For example, dielectric material 430 may contract and exert a downward force on dielectric material 420. Dielectric material 420 may also contract and surround the electrical wires/splice to provide adequate insulation to the wires/splice.

Figure 5A:
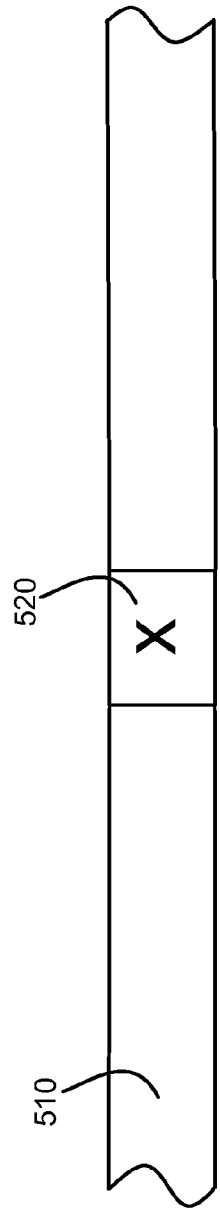

FIGS. 5A-5D illustrate use of cold shrink core 100 to deposit insulation over a splice or other electrical connection. Referring to FIG. 5A, cable 510 may include an electrical spice represented by the "X" at area 520, also referred to herein as splice 520. An installer may place cold shrink assembly 100 over cable 510 and slide cold shrink assembly 100 toward the splice at area 520 such that insulating material 530 is located over the splice (indicated by the dashed X in FIG. 5B). Insulating material 530 shown in FIG. 5B may correspond to cold shrink joint 130.

Figure 5B:
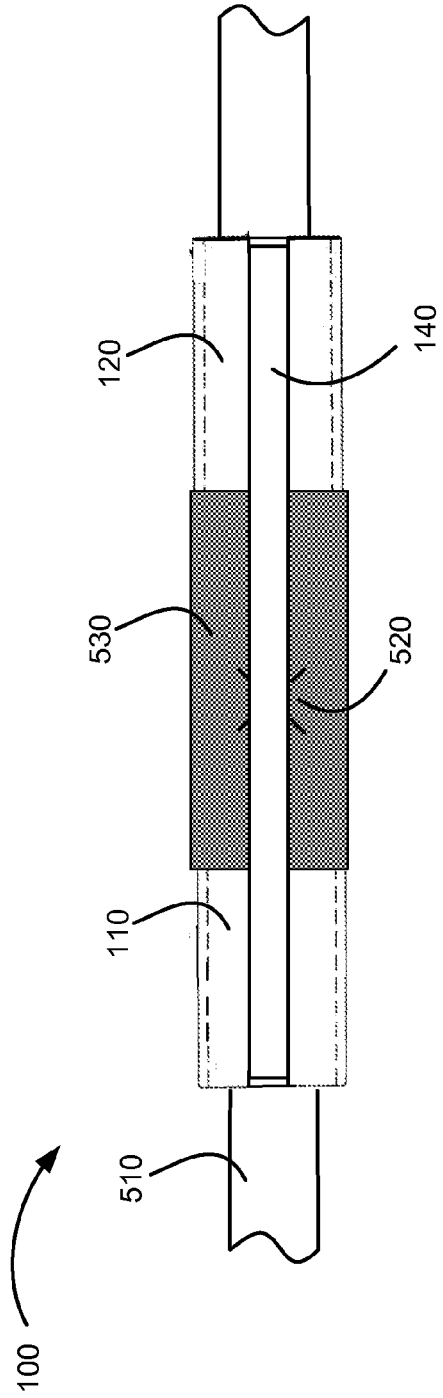

When the insulating material 530 (e.g., cold shrink joint 130) is properly positioned, the installer cuts band 140 shown in FIG. 5B. When band 140 is cut, the removal of the force holding cores 110 and 120 in the desired pre-installation position (e.g., located a small distance apart or abutting each other), along with the contracting of the insulating material 530 exerting a downward force on cores 110 and 120, pushes cores 110 and 120 away from splice area 520, as illustrated in FIG. 5C. As described above, the two halves of each of cores 110 and 120 may separate at this time or be easily separated by hand by applying a small force to separate the halves. The two halves of each of cores 110 and 120 may then be removed from splice area 520. In addition, since band 140 is run externally with respect to cold shrink joint 130, band 140 may also be easily removed from splice area 520. That is, band 140 will not get stuck within the cold shrink material when cold shrink joint 130 is installed. This helps prevent problems and/or contamination associated with splice area 520.

When band 140 is cut, cold shrink material 530 drops onto and contracts over splice 520 to insulate splice 520, as illustrated in FIG. 5D. In this manner, cold shrink assembly 100 may allow an installer to easily install the cold shrink material (e.g., a cold shrink joint 130) at the desired location and simply remove cores 110 and 120 and band 140 from the cable/splice area. This may allow the installer to save significant time with respect to insulating a splice or other electrical connection, while also avoiding problems associated with unwanted material, such as band 140, getting stuck inside the splice.

In accordance with the implementations described above, cold shrink assembly 100 includes cores 110 and 120 and shrink fit joint 130 that is to be deposited over a splice. In other implementations, a cold shrink assembly 100 may include a single core upon which a shrink fit joint is installed. For example, a single core 110 may be used. In this case, a cold shrink joint/material may be formed over core 110. A band, such as band 140, may then extend through loops 112 and 113, in a similar manner as described above with respect to FIG. 1A, traversing the external surface of the shrink fit joint and looping back around the outer end of the shrink fit joint/material. In this implementation, the cold shrink assembly may be used with to insulate an electrical connection or joint within an elbow connection or other termination. For example, the cold shrink assembly may be inserted into an elbow connection, the band may be cut and the single core may be removed. In addition, since the band holding the core in place is located externally with respect to the cold shrink assembly, the band will not get stuck within the splice and/or the elbow.

The foregoing description of exemplary implementations provides illustration and description, but is not intended to be exhaustive or to limit the embodiments described herein to the precise form disclosed. Modifications and variations are possible in light of the above teachings or may be acquired from practice of the embodiments.

For example, implementations described above refer to tapered cores 110 and 120 including two halves that interlock via extensions and grooves. In alternative implementations, cores 110 and 120 may include other mechanisms to secure two separable halves.

In addition, implementations described above refer to using band 140 to aid in holding cores 110 and 120 in the desired position prior to installation. In other implementations, other mechanisms may be used to aid in securing cores 110 and 120 and positioning cold shrink material prior to releasing the cold shrink material over the splice or other desired location. In still other implementations, band 140 may not be used. In this implementation, cores 110 and 120 may be sized to ensure that cores 110 and 120 do not push out from cold shrink assembly 100 prior to the installation of the cold shrink material. In this implementation, the installer may exert a slight force (e.g., by hand) to remove cores 110 and 120 from cold shrink joint 130 at the time of installation.

Although the invention has been described in detail above, it is expressly understood that it will be apparent to persons skilled in the relevant art that the invention may be modified without departing from the spirit of the invention. Various changes of form, design, or arrangement may be made to the invention without departing from the spirit and scope of the invention. Therefore, the above mentioned description is to be considered exemplary, rather than limiting, and the true scope of the invention is that defined in the following claims.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A cold shrink assembly, comprising:
   a first member having a tapered shape, wherein a first end of the first member includes a first opening or first notch located on a first side of the first member and a second opening or second notch located on a second side of the first member opposite the first opening;
   a second member having a tapered shape, wherein a first end of the second member includes a third opening or third notch located on a first side of the second member and a fourth opening or fourth notch located on a second side of the second member opposite the third opening;
   a shrink fit joint disposed over a portion of the first and second members; and
   a band configured to:
      secure the first and second members in a predetermined position, wherein the band forms a loop that extends through the first opening or first notch and the second opening or second notch of the first member, extends along a first side of an outer surface of the cold shrink assembly, extends through the third opening or third notch and the fourth opening or fourth notch, and loops back to the first opening or first notch along a second side of the outer surface of the cold shrink assembly.

2. The cold shrink assembly of claim 1, wherein the band includes at least one buckle configured to allow the band to be tightened to secure the first and second members in the predetermined position.

3. The cold shrink assembly of claim 1, wherein the first opening or first notch comprises a first opening located on the first side of the first member and the second opening or second notch comprises a second opening located on the second side of the first member.

4. The cold shrink assembly of claim 1, wherein the first opening or first notch comprises a first notch located on the first side of the first member and the second opening or second notch comprises a second notch located on the second side of the first member.

5. The cold shrink assembly of claim 1, wherein the first and second members each comprise a plastic material that is substantially cylindrical in shape.

6. The cold shrink assembly of claim 1, wherein the predetermined position comprises a tapered end of the first member being located a predetermined distance from a tapered end of the second member, wherein the tapered end of the first member is located opposite the first end of the first member and the tapered end of the second member is located opposite the first end of the second member.

7. The cold shrink assembly of claim 6, wherein the predetermined distance ranges from approximately 0.1 inches to 1.0 inches.

8. The cold shrink assembly of claim 1, wherein the first member includes a first half and a second half coupled together and the second member includes a third half and a fourth half coupled together.

9. The cold shrink assembly of claim 8, wherein the first half of the first member comprises:
   a first tab that runs along a first side of the first half, and
   a first groove that runs along a second side of the first half,
   wherein the second half of the first member comprises:
   a second groove that runs along a first side of the second half, and
   a second tab that runs along a second side of the second half,
   wherein the first tab is received by the second groove and the second tab is received by the first groove to secure the first half to the second half, and
   wherein the first tab includes angled sides, and the second groove includes correspondingly angled sides to hold the first and second halves together.

10. The cold shrink assembly of claim 1, wherein the first and second members are configured to move away from a center portion of the shrink fit joint when the band is cut to allow the first and second members to be removed.

11. The cold shrink assembly of claim 10, wherein the first and second members are configured to be removed from the shrink fit joint without the use of a tool.

12. A cold shrink assembly, comprising:
a first member having a tapered shape;
a second member having a tapered shape;
an insulating material and semiconductive material disposed over a portion of the first and second members; and
a band or strap configured to:
secure the first and second members in a predetermined position until the insulating material is to be installed over an electrical connection,
wherein the band or strap extends through a first notch located on a first end of the first member, through a second notch located on the first end of the first member, extends along a first outer side of the cold shrink assembly, through a third notch located on a first end of the second member, through a fourth notch located on the first end of the second member, and extends along a second outer side of the cold shrink assembly to the first notch.

13. The cold shrink assembly of claim 12, wherein the first and second members each comprise a substantially cylindrical, hollow tube.

14. The cold shrink assembly of claim 12, wherein the predetermined position comprises a tapered end of the first member being located a predetermined distance from a tapered end of the second member, wherein the tapered end of the first member is located opposite the first end of the first member and the tapered end of the second member is located opposite the first end of the second member.

15. The cold shrink assembly of claim 12, wherein the first and second members are configured to move away from a center portion of the insulating material when the band or strap is cut to allow the first and second members to be removed.

16. The cold shrink assembly of claim 15, wherein the first and second member are configured to be removed after installation of the insulating material without the use of a tool.

17. The cold shrink assembly of claim 12, wherein the first member comprises first and second portions that are coupled together and are configured to be separable from each other,
wherein the second member comprises third and fourth portions that are coupled together and are configured to be separable from each other, and
wherein the first and second portions of the first member are coupled to each other using extensions and corresponding grooves that are connected to each other in a dove-tail configuration.

18. A method, comprising:
placing a cold shrink joint onto a first member and a second member, wherein the first and second members comprises tapered tubes;
determining that the first and second tubes are located in a predetermined position with respect to each other, wherein the predetermined position corresponds to a narrower end of the first tube being located a predetermined distance apart from a narrower end of the second tube, wherein the predetermined distance is less than one inch; and
installing a band or strap to hold the first and second members in the predetermined position until the cold shrink joint is installed.

19. The method of claim 18, wherein the predetermined distance is approximately 0.1 inches.

20. The method of claim 18, wherein installing the band or strap comprises:
installing the band or strap to extend through first and second notches of the first tube, extend over an outer surface of the cold shrink joint, extend through third and fourth notches of the second tube and extend back to the first notch.

* * * * *